Oct. 29, 1940.  H. C. SPENCER  2,219,703
PHOTOGRAPHIC TEST STRIP
Filed Dec. 4, 1939
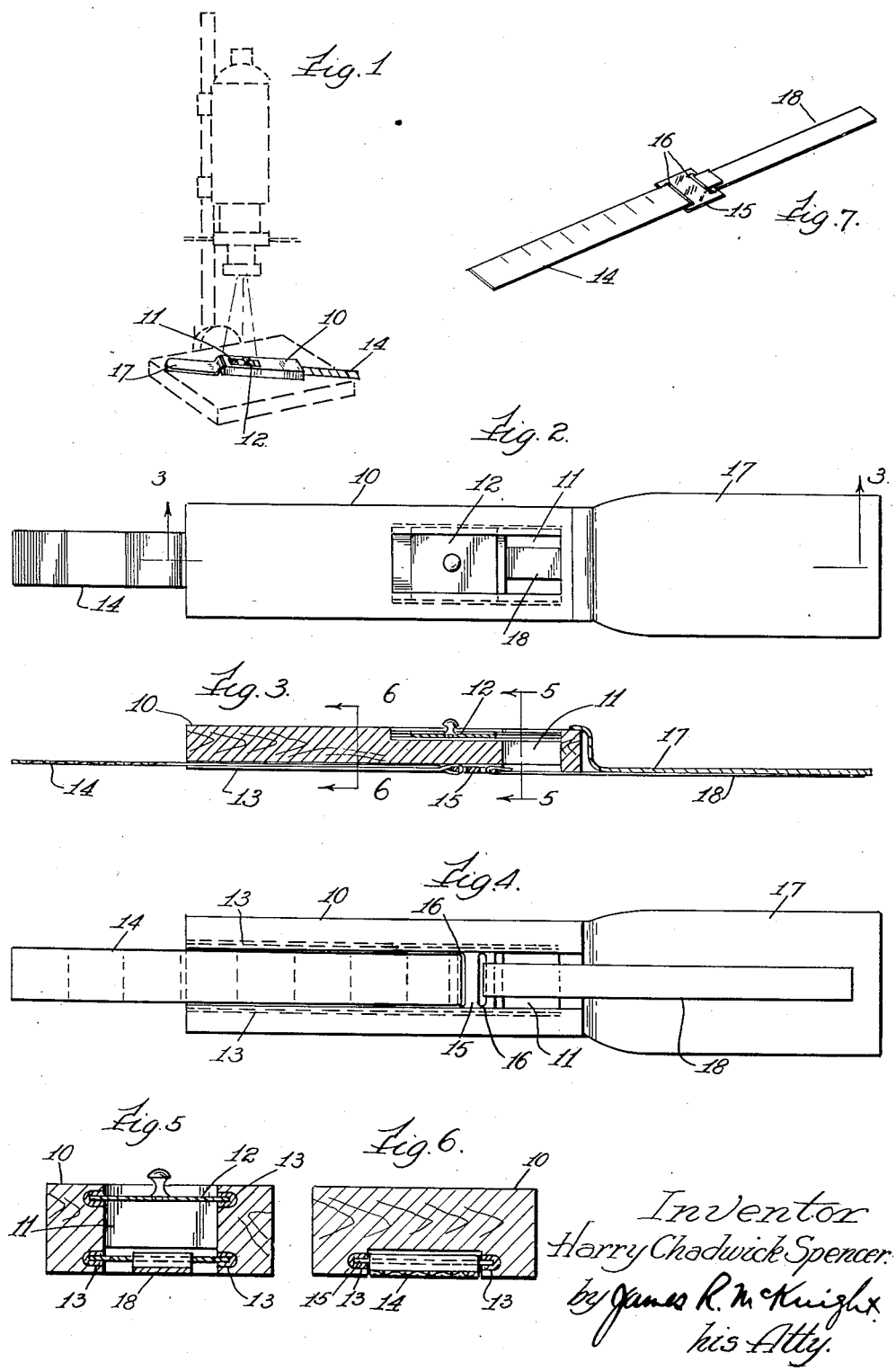

Patented Oct. 29, 1940

2,219,703

UNITED STATES PATENT OFFICE 2,219,703

PHOTOGRAPHIC TEST STRIP

Harry Chadwick Spencer, New York, N. Y.

Application December 4, 1939, Serial No. 307,387

2 Claims. (Cl. 95—10)

My invention relates to a device for making experimental tests to determine the proper length of time for making photographic prints or enlargements.

Among the objects of my invention are to provide a device for making such tests which can use the same section of the film at all times so that the density of the tests on the test strip will not vary with the density of the film but only with the length of printing time; to provide a device capable of making a series of identical pictures varying only in density on a single test strip of photographic paper; to provide a device which will be economical and simple to use and which will insure more accurate determination of the proper length of exposure; and such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Referring to the drawing, Fig. 1 is a perspective view showing the use of my strip tester with a conventional photo enlargement device; Fig. 2 is a top plan view of my device; Fig. 3 is a longitudinal section of my device on line 3—3 of Fig. 2; Fig. 4 is a bottom plan view of my device; Fig. 5 is a detail sectional view on line 5—5 of Fig. 3; Fig. 6 is a detail sectional view on line 6—6 of Fig. 3; Fig. 7 is a detailed view of an assembled tape and test strip.

One embodiment selected to illustrate my invention comprises a body member 10, which may be constructed of wood, metal or any desirable material. Adjacent one end of the body member 10 is an aperture 11 which is normally covered by a shutter 12. The shutter 12 may be temporarily moved so as to leave the aperture 11 exposed.

Extending the full length beneath the body member 10 are grooves 13 adapted to hold an elongated tape 14 and a metal strip 15. The tape 14 is attached to the metal strip 15, which strip 15 has an opening or openings 16 adapted to hold the sensitive photographic paper. Extending from the end nearest which the aperture 11 is located is an extension 17 comprised of a piece of leather or other suitable material which is adapted to shield a portion of the sensitive paper from the light. This extension may be integral with the body member 10 or may be made in any suitable maner for the purpose of shielding the sensitive paper.

In operation a strip of sensitive photographic paper 18 is attached to the metal strip 15 through insertion into the openings 16 or by other suitable means. The metal strip 15 is at this time adjacent the same end of the body member 10 as the aperture 11. The tape 14 may then be pulled from the other end until a portion of the photographic strip 18 is below the aperture 11. By displacing the shutter 12 a portion of the strip may be exposed to the light from the enlarger which passes through the negative which is to be printed or enlarged. The tape 14 may then be pulled further so as to expose the next section of the photographic strip 18 in the same manner as before. The portions of the photographic strip 18 which have not been exposed are shielded by the extension 17 which extends from the body member 10. The tape 14 may be marked in any appropriate manner to indicate the correct distance it should be pulled to expose the next section of photographic paper.

It will be noted that the use of my test device results in a series of exposures of varying lengths of time, all made from the same section of film. There is no danger of variance in the density of the prints due to variance in the density of different portions of the film. There is also no danger of the test strip curling and getting out of focus. The user may, of course, make tests of different sections of the film if he so desires.

Instead of providing the extension 17 to shield the unexposed portion of the photographic strip, or the exposed portion if the direction of movement is the opposite of that described above, the body member 10 may be so constructed that the strip will pass or remain in or beneath the body member 10 and thus eliminate the extension 17.

My device is simple in construction and use so that photographers will have no difficulty in determining the proper time of exposure to use when making photographic enlargements.

Having thus described my invention, I claim:

1. A device for determining the proper time of exposure for photographic prints or enlargements comprising a body member having an opening adjacent one end, a shutter normally covering said opening, said shutter mounted on the upper portion of said body member adjacent the opening and slidable along the length of said body member to uncover said opening, a tape slidably mounted within the bottom of said body member, holding means attached to said tape to receive and hold the end of a strip of sensitive photographic paper, said tape, holding means and photographic paper being slidable along the length of said body member so as to expose successive portions of said photographic paper beneath said opening and shutter for various lengths of exposure, and means for shielding the remainder of said photographic paper from exposure.

2. A device for determining the proper time of exposure for photographic prints or enlargements comprising a body member having an opening adjacent one end, a shutter normally covering said opening, said shutter mounted on the upper portion of said body member adjacent the opening and slidable along the length of said body member to uncover said opening, a tape slidably mounted within the bottom of said body member, holding means attached to said tape to receive and hold the end of a strip of sensitive photographic paper, said tape, holding means and photographic paper being slidable along the length of said body member so as to expose successive portions of said photographic paper beneath said opening and shutter for various lengths of exposure, said tape having markings corresponding in size to said opening so as to indicate the correct distance of movement for exposing said portions, and means for shielding the remainder of said photographic paper from exposure.

HARRY CHADWICK SPENCER.